W. CUSHING.
WHEEL TURNING DEVICE.
APPLICATION FILED MAY 11, 1910.
1,000,898.
Patented Aug. 15, 1911.
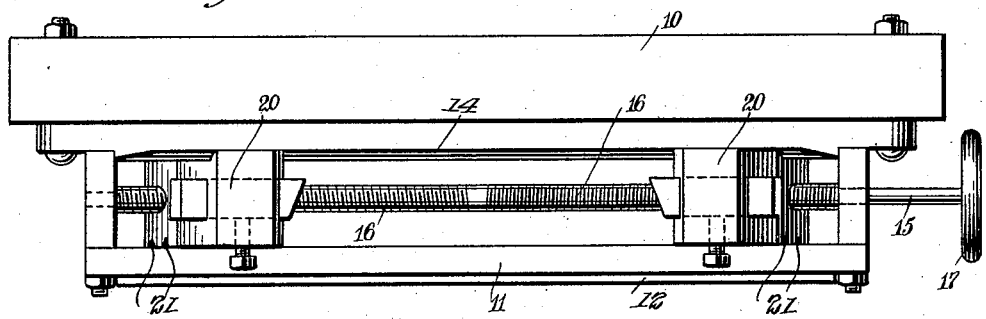
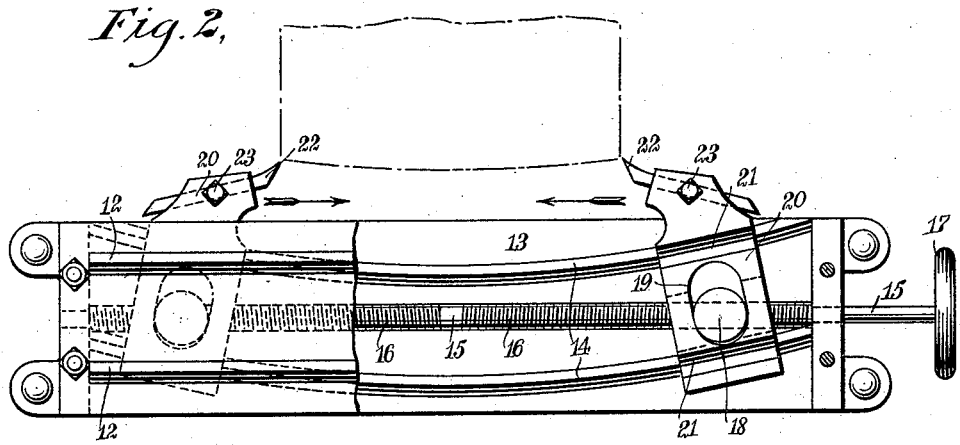
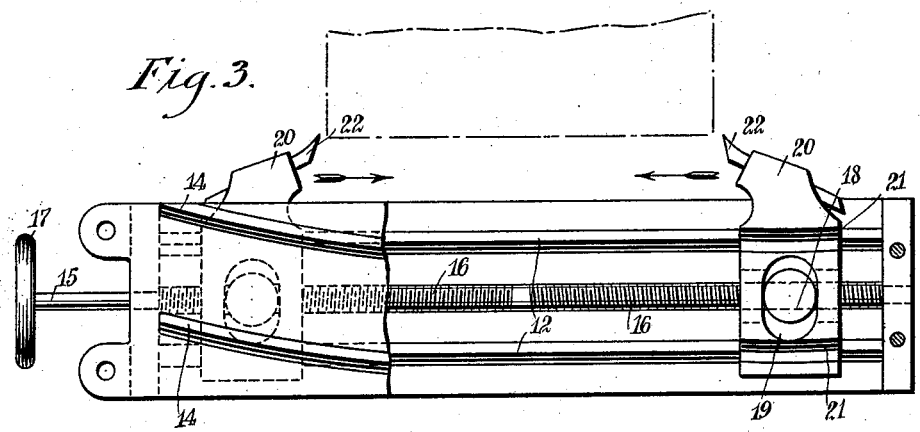
WITNESSES:
Edward Thorpe,
INVENTOR
William Cushing
BY
ATTORNEYS

UNITED STATES PATENT OFFICE.

WILLIAM CUSHING, OF CLAYSVILLE, PENNSYLVANIA.

WHEEL-TURNING DEVICE.

1,000,898.　　　　Specification of Letters Patent.　Patented Aug. 15, 1911.

Application filed May 11, 1910. Serial No. 560,616.

*To all whom it may concern:*

Be it known that I, WILLIAM CUSHING, a citizen of the United States, and a resident of Claysville, in the county of Washington and State of Pennsylvania, have invented a new and Improved Wheel-Turning Device, of which the following is a full, clear, and exact description.

The invention relates to turning, and has for an object to provide a wheel turning device for turning flat or crown surfaces on the peripheries of wheels too large to be mounted on a lathe. For the purpose mentioned use is made of a bed provided with a straight track and a curved track, a tool carriage mounted to operate on the tracks, and means for operating the carriage over either of the tracks.

Reference is to be had to the accompanying drawings, constituting a part of this specification, in which similar characters of reference denote corresponding parts in all the views and in which—

Figure 1 is a view showing my device turned on end and looking at the front face of the same; Fig. 2 is a plan view with parts broken away to disclose the carriages operating over the curved track; and Fig. 3 is an inverted plan view with parts broken away to disclose the carriages operating over the straight track.

Referring more particularly to the figures, I provide a bed or frame 10 having a removable plate 11. The inner surface of the plate 11 is provided with a straight track 12 and the opposite plate 13 of the bed 10 is provided with a curved track 14. A screw rod 15, having oppositely turned threads 16 and a controlling wheel 17, is mounted to turn in the frame 10. Trunnions 18 are mounted to engage the screw rod 15 and operate in slots 19 of similar carriages 20. The carriages 20 have tracks 21 on both sides of the same, one of the tracks 21 being adapted to contact with the curved track 14 and the other track 21 being adapted to contact with the straight track 12. Tools 22 are adapted to be removably held on the carriages 20 by means of bolts 23, and it will be understood that various kinds and shaped tools can be employed.

In the operation of my device, when it is desired to turn a crown surface on a wheel, the wheel is first mounted on a suitable shafting. The device described is then placed in a convenient cutting position with the curved track 14 beneath the carriages 20 so that the said carriages will operate over the curved track. In order that the straight track 12 will not interfere with the operation of the carriages over the curved track, the plate 11, having the straight track 12 thereon is reversed, as shown in Fig. 1, so that the flat surface of the plate 11 will constitute one of the bearing sides for the carriages 20 while they operate over the straight track. Now, after the turning device is correctly alined with the wheel to be crowned, the wheel is turned and the operating wheel 17 is operated to feed the carriages 20 toward each other. The tools 22 will engage the wheel and cut the peripheral surface of the same and as will be easily understood, the surface of the wheel will be curved or crowned owing to the curvature of the track 14. When it is desired to cut a flat surface on the wheel the plate 13 having the curved track 14 thereon is reversed so that the flat surface of the plate 13 will constitute a bearing side for the carriages 20 and the plate 11 is also reversed so that the straight track 12 will contact wit hthe carriages 20, that is, the carriages 20 will now be operative over the straight track, and the resultant cut of the tools on the carriages will produce a straight peripheral surface on the wheel.

It will be understood that any number of similar carriages can be employed; and it will be further understood that although I have shown a particular form of my device for the purpose of describing the same, the scope of the invention is defined in the appended claims.

Having thus described my invention, I claim as new and desire to secure by Letters Patent:

1. A device of the class described comprising a bed provided with a curved track, a plate provided with a straight track and connected to the bed with the said plate spaced from the curved track and constituting a bearing member, and carriages mounted to operate over the curved track with the said plate acting as a bearing member for the carriages, the said plates being adapted to be reversed whereby the said carriages may operate in the said straight track, the said bed then acting as a bearing member.

2. A device of the class described, comprising a bed provided with a curved track and constituting a bearing member, a plate provided with a straight track and connected to the bed with the bed spaced from the said straight track, and carriages mounted to operate over the straight track with the said bed acting as a bearing member for the carriages, the said plates being adapted to be reversed whereby the said carriages may operate in the said straight track, the said bed then acting as a bearing member.

3. A device of the class described comprising a bed provided with a curved track, a plate provided with a straight track and connected to the bed with the said plate spaced from the curved track and constituting a bearing member a screw rod mounted on the said bed, trunnions on the screw rod, and slotted carriages disposed between the said bed and said plate to operate over the curved track with the said plate acting as a bearing member, the said trunnions extending into the slots of the said carriages, the said plates being adapted to be reversed whereby the said carriages may operate in the said straight track, the said bed then acting as a bearing member.

4. A device of the class described comprising a bed provided with a curved track and constituting a bearing member, a plate provided with a straight track and connected to the bed, with the said bed spaced from the said straight track, a screw rod mounted on the said bed, trunnions on the screw rod, and slotted carriages disposed between the said bed and said plate to operate over the straight track with the said plate acting as a bearing member, the said trunnions extending into the slots of the said carriages, the said plates being adapted to be reversed whereby the said carriages may operate in the said straight track, the said bed then acting as a bearing member.

5. A device of the character described, comprising a frame, a plate supported thereby and provided with a curved track, and further provided with a guiding surface independent of said curved track, a second plate supported by said frame and provided with a straight track and with a guiding surface independent of said straight track, each of said plates being reversible relatively to said frame, a pair of carriages, each provided with a surface for engaging said curved track of said first-mentioned plate, and with a surface for engaging said guiding surface of said second-mentioned plate, said carriages being each further provided with a surface for engaging said straight track of said second-mentioned plate and with a surface for engaging said guiding surface of said first-mentioned plate, means for mounting tools upon said carriages, and mechanism controllable at the will of the operator for forcing said carriages toward and from each other.

6. A device of the character described, comprising a frame, a plate mounted thereupon and reversible relatively thereto, said plate being provided upon one of its faces with a curved track and upon its opposite face with a guiding surface independent of said curved track, a second plate supported by said frame and reversible relatively thereto, said second plate being provided upon one of its faces with a straight track and upon its opposite face with a guiding surface independent of said straight track, a carriage disposed between said plates and provided with a surface for engaging said curved track of said first-mentioned plate and with another surface for engaging said guiding surface of said second-mentioned plate, said carriage being further provided with a surface for engaging said straight track of said second-mentioned plate and with an additional surface for engaging said guiding surface of said first-mentioned plate, means for holding a tool upon said carriage, and mechanism for moving said carriage relatively to said frame.

7. A device of the character described, comprising a frame, a plate supported thereby and provided with a curved track and with a flat bearing surface opposite said curved track, a second plate supported by said frame and provided with a straight track and with a flat bearing surface opposite said straight track, a carriage disposed between said plates and provided with a surface for engaging said curved track and with another surface for engaging said flat bearing surface of said first-mentioned plate, said carriage being also provided with a surface for engaging said straight track and with a surface for engaging said flat bearing surface of said second-mentioned plate, means for moving said carriage bodily in relation to said frame, and means for mounting a tool upon said carriage.

In testimony whereof I have signed this specification in the presence of two subscribing witnesses.

WILLIAM CUSHING.

Witnesses:
JOHN S. DANLEY,
GEORGE ALLISON.